United States Patent
Wang et al.

(10) Patent No.: US 10,445,271 B2
(45) Date of Patent: Oct. 15, 2019

(54) MULTI-CORE COMMUNICATION ACCELERATION USING HARDWARE QUEUE DEVICE

(71) Applicant: Intel Corporation, Santa Clara, CA (US)

(72) Inventors: Ren Wang, Portland, OR (US); Namakkal N. Venkatesan, Hillsboro, OR (US); Debra Bernstein, Sudbury, MA (US); Edwin Verplanke, Chandler, AZ (US); Stephen R. Van Doren, Portland, OR (US); An Yan, Orefield, PA (US); Andrew Cunningham, Ennis (IE); David Sonnier, Austin, TX (US); Gage Eads, Austin, TX (US); James T. Clee, Orefield, PA (US); Jamison D. Whitesell, Bethlehem, PA (US); Yipeng Wang, Beaverton, OR (US); Jerry Pirog, Easton, PA (US); Jonathan Kenny, Galway (IE); Joseph R. Hasting, Orefield, PA (US); Narender Vangati, Austin, TX (US); Stephen Miller, Round Rock, TX (US); Te K. Ma, Allentown, PA (US); William Burroughs, Macungie, PA (US); Andrew J. Herdrich, Hillsboro, OR (US); Jr-Shian Tsai, Portland, OR (US); Tsung-Yuan C. Tai, Portland, OR (US); Niall D. McDonnell, Limerick (IE); Hugh Wilkinson, Newton, MA (US); Bradley A. Burres, Waltham, MA (US); Bruce Richardson, Sixmilebridge (IE)

(73) Assignee: Intel Corporation, Santa Clara, CA (US)

( * ) Notice: Subject to any disclaimer, the term of this patent is extended or adjusted under 35 U.S.C. 154(b) by 328 days.

(21) Appl. No.: 14/987,676

(22) Filed: Jan. 4, 2016

(65) Prior Publication Data

US 2017/0192921 A1 Jul. 6, 2017

(51) Int. Cl.
*G06F 13/37* (2006.01)
*G06F 12/0811* (2016.01)
(Continued)

(52) U.S. Cl.
CPC .......... *G06F 13/37* (2013.01); *G06F 12/0811* (2013.01); *G06F 12/0868* (2013.01);
(Continued)

(58) Field of Classification Search
CPC .. G06F 13/37; G06F 13/1642; G06F 12/0811; G06F 2212/283
See application file for complete search history.

(56) References Cited

U.S. PATENT DOCUMENTS 6,295,598 B1 * 9/2001 Bertoni ............... G06F 12/0826
711/E12.031
7,180,887 B1 * 2/2007 Schwaderer .......... H04L 45/742
370/351

(Continued)

OTHER PUBLICATIONS

Cisco, Cisco MDS NX-OS Release 5.0(1a), 2004, Chapter 1.*
(Continued)

*Primary Examiner* — Henry Tsai
*Assistant Examiner* — Christopher A Daley
(74) *Attorney, Agent, or Firm* — Nicholson De Vos Webster & Elliott LLP

(57) ABSTRACT

Apparatus and methods implementing a hardware queue management device for reducing inter-core data transfer overhead by offloading request management and data coherency tasks from the CPU cores. The apparatus include
(Continued)

multi-core processors, a shared L3 or last-level cache ("LLC"), and a hardware queue management device to receive, store, and process inter-core data transfer requests. The hardware queue management device further comprises a resource management system to control the rate in which the cores may submit requests to reduce core stalls and dropped requests. Additionally, software instructions are introduced to optimize communication between the cores and the queue management device.

19 Claims, 16 Drawing Sheets

(51) Int. Cl.
  *G06F 13/16* (2006.01)
  *G06F 12/0868* (2016.01)
  *G06F 12/04* (2006.01)
  *G06F 9/38* (2018.01)
(52) U.S. Cl.
  CPC ...... *G06F 13/1642* (2013.01); *G06F 13/1673* (2013.01); *G06F 9/3842* (2013.01); *G06F 12/04* (2013.01); *G06F 2212/283* (2013.01); *G06F 2212/6046* (2013.01)

(56) References Cited

U.S. PATENT DOCUMENTS

| | | | |
|---|---|---|---|
| 7,290,056 B1* | 10/2007 | McLaughlin, Jr. | ............... H04L 43/0852 709/201 |
| 8,719,831 B2* | 5/2014 | Radmilac | ............ G06F 9/5083 718/100 |
| 8,761,188 B1* | 6/2014 | Krikelis | ............. G06F 15/7896 370/412 |
| 8,880,696 B1* | 11/2014 | Michels | ............... G06F 13/287 709/225 |
| 8,897,134 B2* | 11/2014 | Kern | ..................... H04L 45/02 370/235 |
| 2005/0141424 A1 | 6/2005 | Lim et al. | |
| 2005/0147038 A1 | 7/2005 | Chandra et al. | |
| 2006/0085591 A1* | 4/2006 | Kumar | ................ G06F 12/0831 711/113 |
| 2007/0112825 A1 | 5/2007 | Cook et al. | |
| 2010/0332698 A1* | 12/2010 | Muller | ................... H04L 49/90 710/57 |
| 2011/0061108 A1* | 3/2011 | Arrasvuori | .............. G06F 21/10 726/27 |
| 2013/0173771 A1* | 7/2013 | Ditto | ................... G06F 11/1438 709/223 |
| 2013/0326528 A1* | 12/2013 | Shankar | ................ G06F 9/4881 718/103 |
| 2014/0201409 A1* | 7/2014 | Dalal | ..................... G06F 13/16 710/116 |
| 2014/0229957 A1 | 8/2014 | Zhang et al. | |
| 2015/0007189 A1 | 1/2015 | De et al. | |
| 2015/0110126 A1* | 4/2015 | Edmiston | ............ H04L 49/9063 370/413 |

OTHER PUBLICATIONS

International Search Report and Written Opinion for Application No. PCT/US2016/065170, dated May 19, 2017, 14 pages.
International Preliminary Report on Patentability for Application No. PCT/US2016/065170, dated Jul. 19, 2018, 11 pages.

* cited by examiner

| METADATA | QUEUE ENTRY, PRIORITY, FORMAT, QE LENGTH, ETC. | OPAQUE DATA IGNORED BY QMD | SIZE = 16MB MINUS METADATA |

QMD 16B ENTRY FORMAT

| METADATA | QUEUE ENTRY, PRIORITY, FORMAT, QE LENGTH, ETC. | OPAQUE DATA IGNORED BY QMD | SIZE = 32MB MINUS METADATA |

QMD 32B ENTRY FORMAT

| METADATA | QUEUE ENTRY, PRIORITY, FORMAT, QE LENGTH, ETC. | OPAQUE DATA IGNORED BY QMD | SIZE = 64MB MINUS METADATA |

QMD 64B ENTRY FORMAT

FIG. 3

| METADATA | | | | | OPAQUE DATA IGNORED BY QMD |
|---|---|---|---|---|---|
| REORDERING REQUIRED? | ATOMIC? | PERFORM LOAD BALANCING? | FRAGMENTATION? | SEQUENCE # | ETC. | SIZE = TOTAL QUEUE SIZE MINUS METADATA |

QMD QUEUE ENTRY FORMAT (LENGTH MAY VARY)

FIG. 4

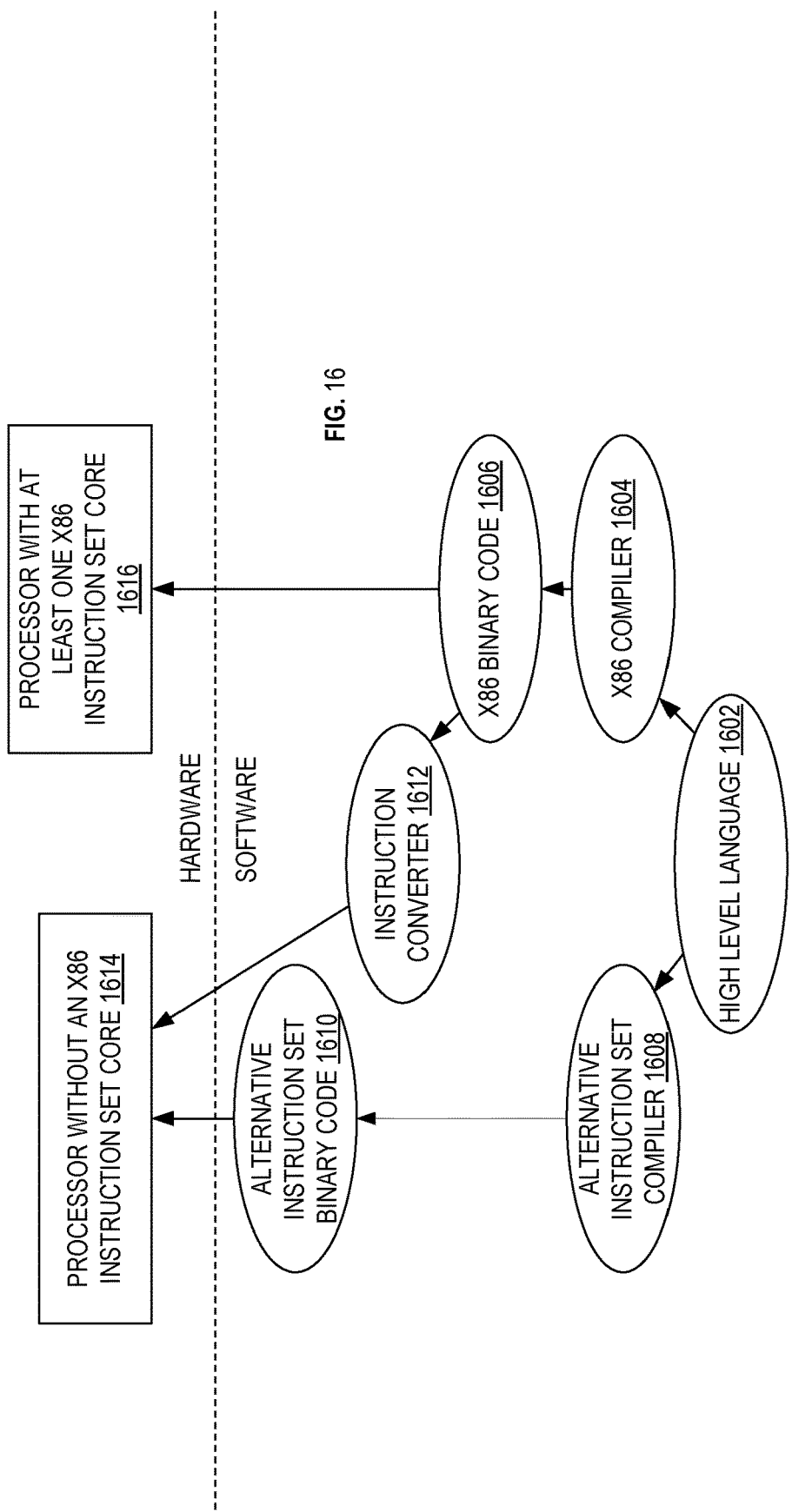

MULTI-CORE COMMUNICATION ACCELERATION USING HARDWARE QUEUE DEVICE

BACKGROUND INFORMATION

Core-to-core ("C2C") communication is critical in many computer applications today such as packet processing, high-performance computing, machine learning, and data center/cloud workloads. In chip multi-processor ("CMP") architectures, as the number of cores increases, C2C communication often becomes a limiting factor for performance scaling when workloads share data. On a general purpose platform, shared memory space between cores is often employed to realize efficient C2C communication. However, the need to carefully manage the shared memory space by software, together with the increase in hardware coherency traffic, tend to incur significant overhead. As a result, CPU cores and network-on-chip ("NoC") designs that share coherent caches typically experience substantially longer latency and higher data traffic, while expending considerable resources to carry-out communication-related work. This keeps CPU cores and NoCs from performing their intended data processing tasks.

In general, software queues such as the classic Lamport algorithm are commonly used on CMP platforms to enable C2C communication. There are two types of overhead generated in a traditional software queue. The first consist of cycles consumed by queue structure maintenance and synchronization, as well as by flow control and management of shared memory. This type of overhead is referred to as control plane overhead. The second type of overhead comprises of cycles spent on moving of data from one core to another. This type of overhead if referred to as data plane overhead. The sum of control plane and data plane overhead constitute the total overhead required to transfer data across cores. There are both software and hardware optimizations available for alleviating these overheads. The RTE-ring code from the DPDK library (a software optimization) and the hardware-accelerated queueing utilizing Freescale's DPAA technology (a hardware optimization) are examples of the optimization techniques that exist today. However, none of these existing optimizations are ideal at reducing core-to-core communications overhead. This is especially true when it comes to simultaneously reducing both the control-plane overhead and the data-plane overhead.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 3 illustrates exemplary ways to structure a queue entry by the queue management device.

FIG. 4 illustrates exemplary metadata fields of a queue entry in a queue management device.

FIG. 16 illustrates a block diagram contrasting the use of a software instruction converter to convert binary instructions in a source instruction set to binary instructions in a target instruction set according to embodiments of the invention;

DETAILED DESCRIPTION

Embodiments implementing a hardware queue device for reducing core-to-core communication overhead are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. For clarity, individual components in the Figures herein may be referred to by their labels in the Figures, rather than by a particular reference number.

Figure 1:
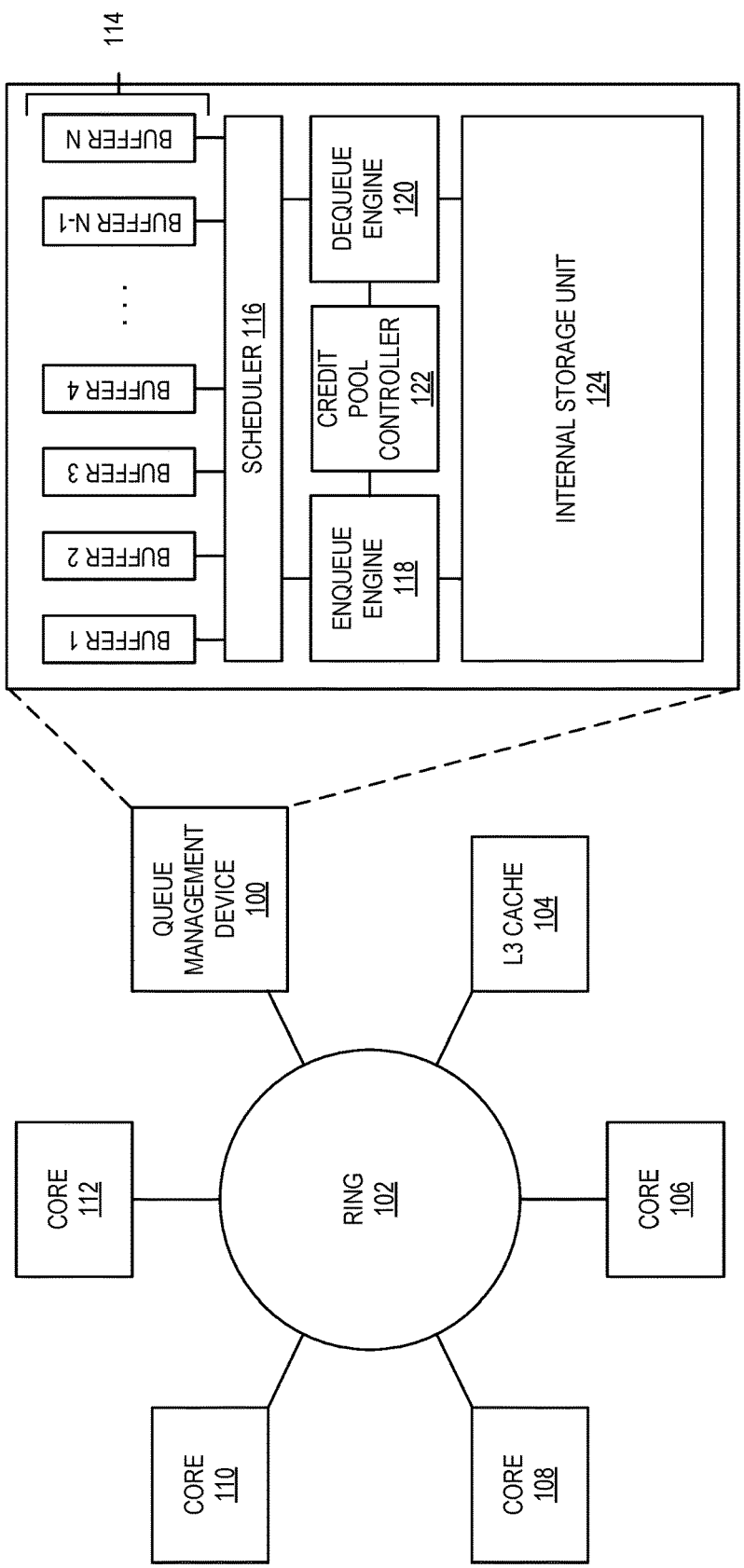
FIG. 1 is a schematic diagram illustrating an exemplary queue management device including various hardware components.

FIG. 1 is a schematic diagram showing an exemplary hardware system utilizing a queue management device (QMD) according to an embodiment. The QMD 100 is attached to a high-speed or network-on-chip ("NoC") interconnect. A ring 102 is shown in the figure as this interconnect but other network formations, such as a mesh, may be also used. The high-speed interconnect connects the CPU cores 106-112 and L3 cache 104 with the QMD 100. Although not illustrated in the diagram, there may be additional CPU cores, L3 caches, and/or other devices connected to the high-speed interconnect. The connection between the CPU cores 106-112, L3 cache 104, and QMD 100 may be a special dedicated interconnect or an existing shared interconnect. Enqueue and dequeue requests sent out by the CPU cores will be routed to the QMD. In one embodiment where acknowledgement is required, the QMD would send a response back to the requesting core after each successful enqueue or dequeue operation to acknowledge the completion of the request. In another embodiment, where acknowledgement is not required, a path between the requesting core and the QMD allows a request to be submitted without returning an acknowledgement back to the requesting core, so long sufficient request resources are provided or reserved. Also shown in FIG. 1 are various components of the QMD 100. The QMD 100 comprises one or more buffers (collectively labeled as 114), a scheduler 116, an engueue engine 118, a dequeue engine 120, a credit pool controller 122, and an internal storage unit 124.

Enqueue and dequeue request sent from the requesting CPU cores is first received and stored by the QMD 100 into one of the buffers 114. The buffers 114 temporarily store the incoming requests as the QMD 100 may not have enough resources or bandwidth to serve all the incoming requests at the moment they are received. The buffers are first in first out (FIFO) queues where the first request into the buffer will be the first request out of the buffer. In one embodiment, a subset of buffers is allocated to store only enqueue requests while another subset is reserved for only dequeue requests. Other ways for allocating the buffers, such as by core, by thread, by request type, etc., may also be used. A single priority level may be assigned across all the buffers to simplify implementation and to maximize throughput. Alternatively, multiple priority level may be implemented to support fine-grained Quality of Service (QoS) features. For example, given n priorities, every enqueue and dequeue buffer pair may be assigned a different priority such that n buffers are allocated for enqueue requests and n buffers are allocated for dequeue requests. Each incoming request has a priority that is either pre-assigned by the requesting core/thread or assigned by the QMD upon receipt by the QMD. Each request is then stored in a buffer that corresponds to the request's priority (1-n) and/or type (enqueue or dequeue).

The scheduler 116 chooses a buffer and selects one or more requests from the head of buffer. The buffer is chosen according to a scheduling policy. Various scheduling policies, such as Round Robin, Weighted Round Robin, preemptive priority, and a combination of these and other policies may be implemented. In a Round Robin policy, for example, the buffers are simply chosen sequentially, i.e. lowest buffer ID to the highest, or vice versa. If a chosen buffer is empty, the scheduler 116 selects from a different buffer. In a Weighted Round Robin policy, the scheduler 116 chooses and serves each buffer sequentially based on their associated priority. The ability to control the order in which to serve the buffers is called request-level flow control. After choosing a buffer and selecting one or more requests from the head of the chosen buffer, the scheduler 116 schedules each selected requests for execution by either the enqueue engine 118 or the dequeue engine 120 according to the request type.

Figure 2:
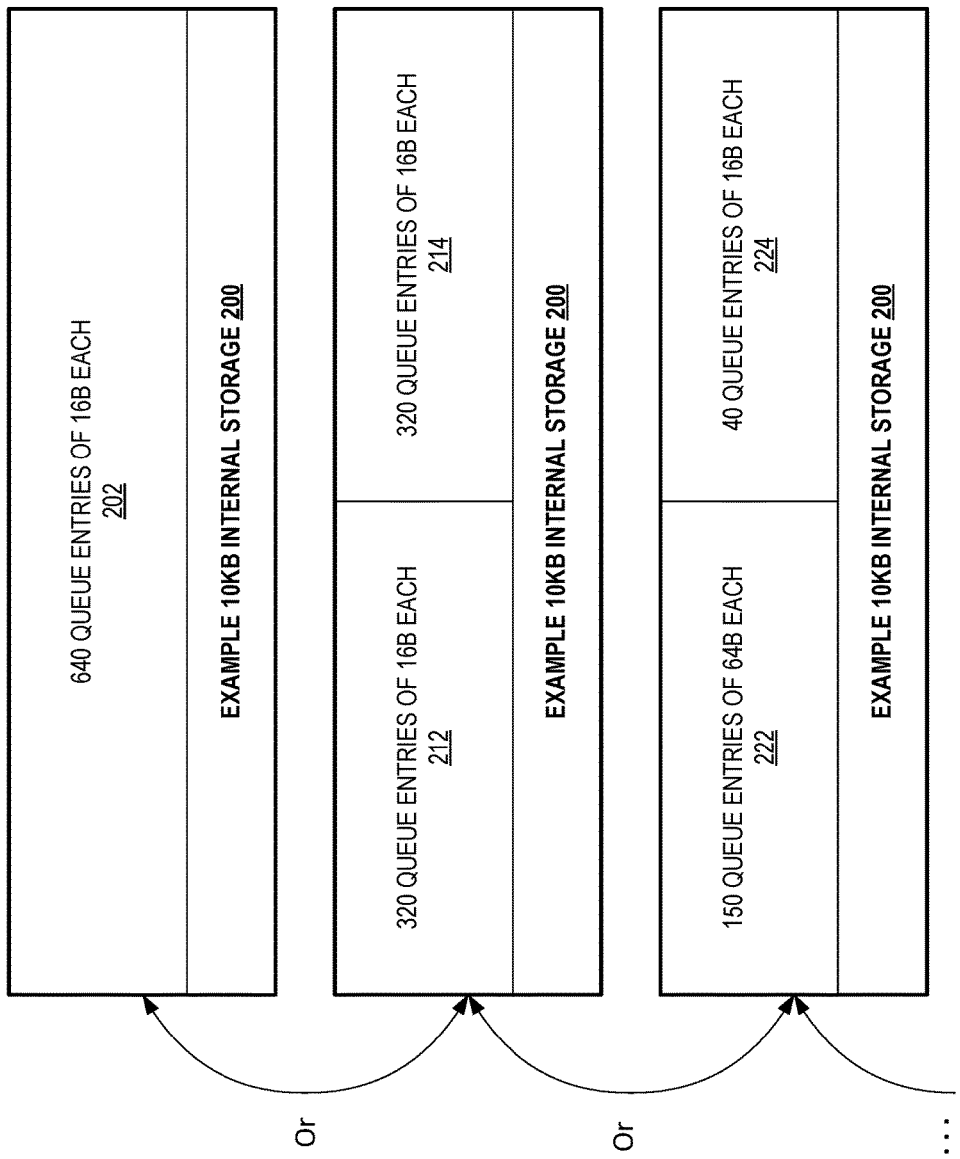
FIG. 2 illustrates exemplary ways to configure the internal storage unit inside a queue management device.

The enqueue engine circuit 118 and dequeue engine circuit 120 read and write to the QMD's internal storage unit 124 through dedicated ports. An enqueue request executed by the enqueue engine 118 causes one data item to be inserted into the internal storage unit 124. A dequeue request executed by the dequeue engine 120 causes one data item to be retrieved from the internal storage unit 124 and sent to the output queue. If a request cannot be executed by the enqueue or dequeue engine, it may be inserted back to the tail of the buffer to be processed later. This reduces the chances of deadlocking a requesting core or device The internal storage unit 124 is used for storing queues and queue entries. It may be comprised of Static Random Access Memory ("SRAM"), Dynamic Random Access Memory ("DRAM"), or any other suitable memory technology. The internal storage unit 124 is configurable to support any number of queues as well as different queue sizes. FIG. 2 illustrates a few embodiments of ways that an internal storage unit may be configured to support different queue and data sizes. In one embodiment, the internal storage unit 200 is a 10 KB SRAM block, all of which are allocated to a single queue 202 containing 640 queue entries that are of 16B each. Of course, other sizes than 10 KB may be used. In another embodiment, the 10 KB SRAM block is split equally among two queues, 212 and 214, such that each queue contains 320 entries that are of 16B each. Alternatively, the 10 KB SRAM block may be configured to support two different size queues where one contains 150 entries of 64B each and the other with 40 entries of 16B each according to an embodiment. Note that these examples are only presented here for illustrative purposes and are in no way limiting. Any combination of queue quantity and entry size may be substituted here to satisfy data storage needs.

FIG. 3 provides embodiments illustrating a flexible queue entry format for supporting queue entries of different lengths and sizes. Although queue entries of sizes 16B through 64B are shown, other queue entry sizes may be used as well. Each queue entry comprises of two parts—metadata and "opaque data." Metadata contains information relating to the queue entry itself, such as queue ID, priority, format, and length. Information contained in each queue entry's metadata is used by the QMD to perform enqueue and dequeue related operations on that entry. The opaque data portion contains the actual data, or pointers to actual data, to be shared with consumer core, thread, device, etc. via a dequeue request. The opaque data portion is generally ignored and untouched by the QMD.

FIG. 4 illustrates an exemplary queue entry's metadata in detail according to an embodiment. The metadata portion of a queue entry contains parameters describing how the queue entry should be handled by the QMD. These parameters provide information on reordering requirements, atomicity, load-balancing, fragmentation, sequencing, etc. Reordering information is used to indicate whether reordering based on the sequence number is required when entries are sent to the output queue. Atomicity information describes whether an entry is to be submitted to a single core at a time. Load balancing information indicates whether load balancing across multiple output queues maybe employed. Fragmentation field is used when deciding whether or not to break up the data for traffic shaping. Note that the actual definition and function of each parameter may differ in each embodiment than from what is described herein. The same goes for parameter fields which may also vary in size and arrangement than what is shown in the figure. New parameters or fields may be added to the metadata for implementing additional functionalities that the QMD may perform on the queue entries.

In some embodiments, a credit management system operates a credit pool controller 122 to manage and track a number of credit pools. Through controlling the credits in each credit pool, the credit management system can adjust the rate and frequency at which the incoming requests are sent by the requesting cores and threads. It prevents an overflow of incoming requests that may cause core stalls or request drops. This, in turn, improves the efficiency of both the requesting cores and threads, as well as the QMD.

Figure 5:
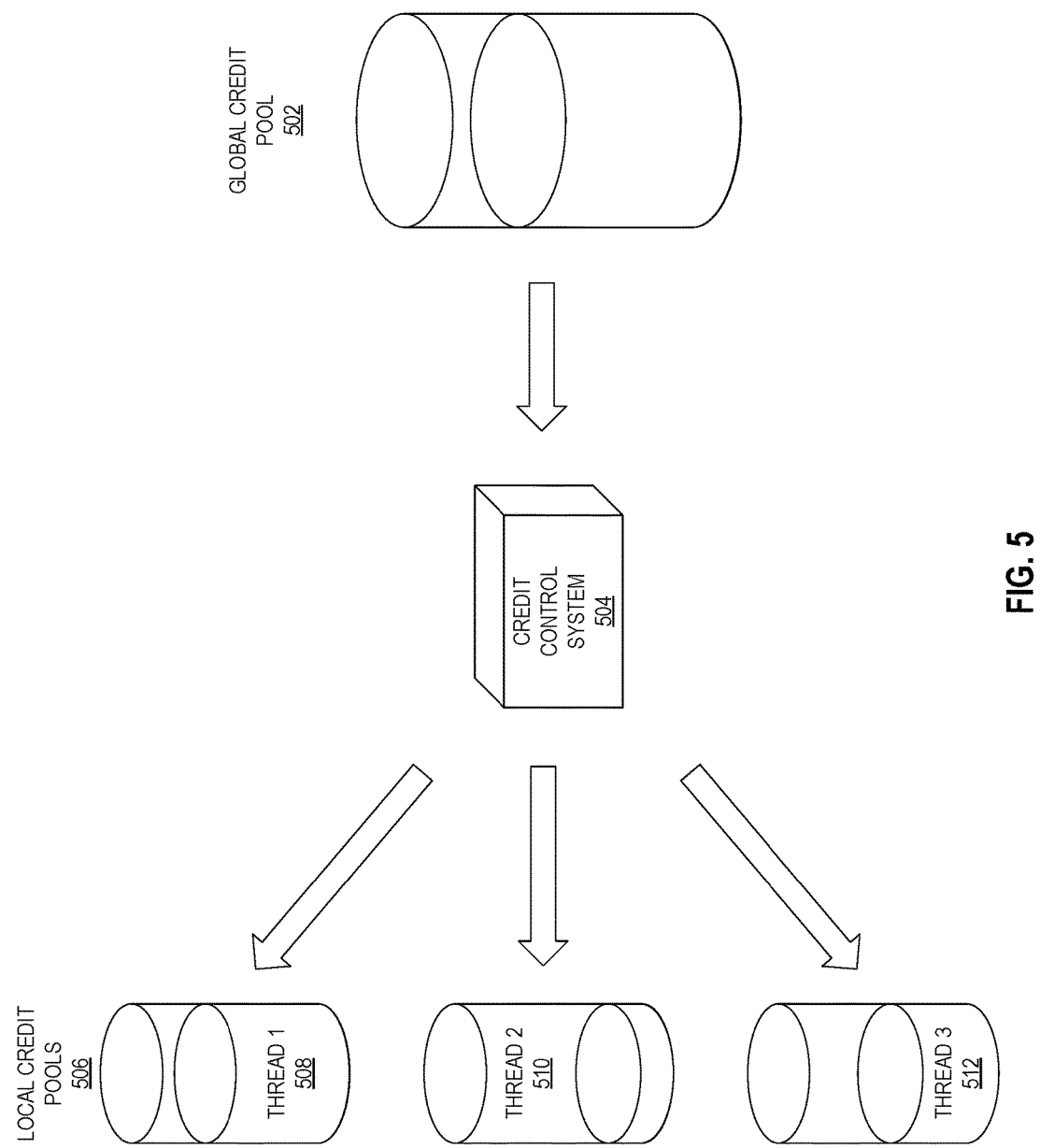
FIG. 5 is a schematic diagram illustrating an exemplary credit control system.

When a core or thread wishes to send an enqueue or dequeue request to the QMD 100, it firsts acquire the appropriate credit from the credits pool controller 122. A request received by the QMD without the appropriate credit will be refused acceptance and/or dropped by the QMD. In one embodiment, the credit pool controller 122 maintains a global enqueue credit pool and a global dequeue credit pool. The size of these global credit pools correspond respectively to the QMD's total capacity for handling incoming enqueue and dequeue requests. The credit pool controller 122 also maintains one pair of local enqueue and dequeue credit pool for each core or thread. The size of each pair of local enqueue and dequeue credit pool correspond to the amount of QMD's capacity allocated to that particular core or thread. The local credit pool may be maintained by each core or thread, or alternatively, tracked centrally by the credit pool controller 122. By controlling the size of each local credit pool and the rate in which they are replenished, the credit pool controller 122 has fine grain control over the number of enqueue/dequeue requests that are sent by each core or thread. For example, the credit pool controller 122 may implement a credit replenishment policy such as Round Robin or Weighted Round Robin to decide when and how much to replenish each local credit pool. The credit pool controller 722 may also retain credits to starve all local credit pools and thus slows down the rate at which the cores/threads send request to help the QMD catch up on pending operations. FIG. 5 is a high-level diagram illustrating the concept of the credit control system 504. The credit control system 504 distributes credits from a global credit pool 502 to one or more local credit pools 506. Each core/thread may have its own local credit pool or may share a local credit pool with other cores/threads. The credit control system 504 replenishes each local credit pool with available credits according to a credit replenishment policy.

Figure 6:
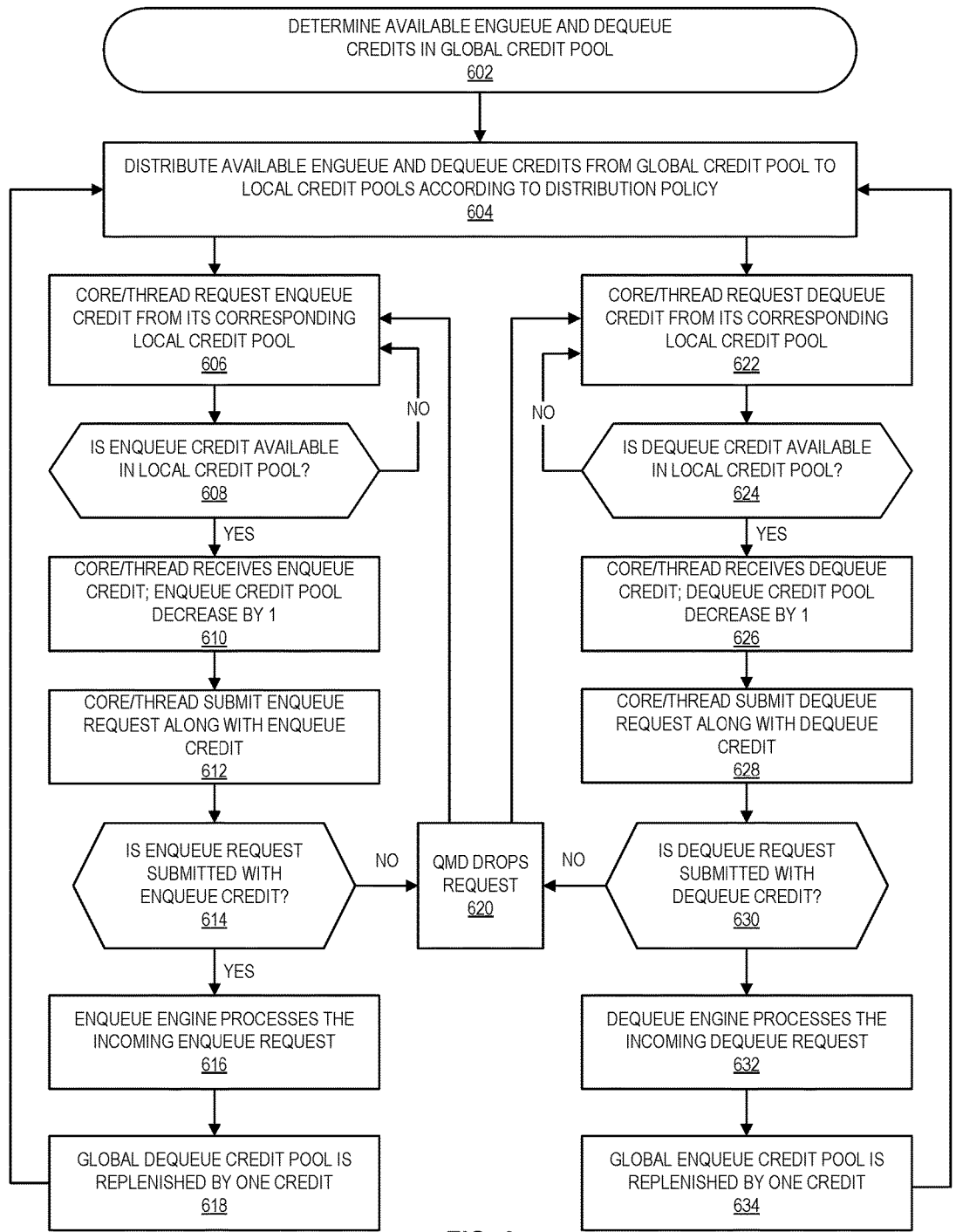
FIG. 6 is a flow chart illustrating an exemplary credit distribution and replenishment process of a credit management system.

FIG. 6 is a flow diagram illustrating an exemplary credit distribution and replenishment processes according to an embodiment. Initially, all available enqueue and dequeue credits are entered into the global credit pool. At 602, the credits pool controller 122 determines the total enqueue and dequeue credits that are available in the global credit pool and then, at 604, distributes the enqueue/dequeue credits from the global credit pool to each local enqueue/dequeue credit pool according to a credit distribution policy. The credit distribution policy determines the rate and the frequency in which to distribute and replenish each local credit pool. The credit distribution policy may be Round Robin, Weighted Round Robin, etc.

From here, if a core or thread wishes to send an enqueue request to the QMD, it would first have to request an enqueue credit from the credit pool controller as in step 606. At 608, the credit pool controller determines if there are enqueue credits available in the local enqueue credit pool that correspond to the requesting core/thread. If no enqueue credits are available, the requesting core or thread must wait until its local enqueue credit pool is replenished. It may do so by resending an enqueue credit request. On the other hand, if enqueue credits are available in the local enqueue credit pool, an enqueue credit is sent from the credit pool controller to the requesting core/thread at 610. The credit count in the local enqueue credit pool is then decreased by one. The core or thread could request a single credit each time it wishes to send a request. Alternatively, the core or thread could request several credits at once and save them for later use.

After receiving the required enqueue credit from the credit controller, the core/thread submits the enqueue request along with the enqueue credit to the QMD at step 612. At 614, the QMD checks to see if the incoming enqueue request is accompanied by the appropriate enqueue credit. If the enqueue request was sent without the required enqueue credit, the request is dropped by the QMD. In one embodiment in addition to dropping the request, the QMD would also return a message to the requesting core/thread to notify that its enqueue request was not processed. On the other hand, if back at 614 the QMD determined that the incoming enqueue request was submitted with the appropriate enqueue credit, the enqueue engine would process the request at 616. Next, a notification would be send from the enqueue engine to the credit pool controller to replenish the global dequeue credit pool by one credit.

If the case of a dequeue request, a similar process would apply. Starting from 622, the requesting core/thread first requests a dequeue credit from the credit pool controller. At 624, the credit pool controller determines if dequeue credits are available in the appropriate local dequeue credit pool corresponding to the requesting core/thread. If no dequeue credits are available, the requesting core/thread would wait a certain time before sending another credit request to the credit pool controller. On the other hand, if dequeue credits are available in the local credit pool, the dequeue credit request is honored. At 626, the credit pool controller sends the requested dequeue credit to the requesting core/thread and then decrease the credit count in the local dequeue credit pool accordingly. At 628, the core/thread sends the dequeue request with dequeue credit to the QMD. At 630, the QMD checks whether the incoming dequeue request was submitted with the required dequeue credit. If the required dequeue credit is not found, the incoming dequeue request is dropped. If, however, appropriate dequeue credit was found, the request is processed by the QMD's dequeue engine at 632. After processing, the dequeue engine notifies the credit pool controller which replenishes the global enqueue credit pool by one credit. Note that enqueue credit pool is replenished when dequeue operations complete, and the dequeue credit pool is replenished after enqueue operations takes place. By controlling the credit replenishment speed via a credit replenishment policy, the credit management system is able to modulate and influence the speed of each thread/core according to their priority level.

In one embodiment, the credit management system is disabled. When the system is disabled, there is no limit on the number of enqueue and dequeue requests that may be sent by each requesting core or thread. Thus, each requesting core/thread may send as many requests as they can until the QMD reaches its maximum capacity and starts to drop subsequent requests. This creates backpressure and may cause the cores/threads to stall as they wait to receive requested data from the QMD. In time, the cores/threads will un-stall themselves when the QMD catches up with processing and responding to requests. It is therefore unnecessary for software application to track the QMD's available resources. When the credit management system is disabled, the QMD can achieve the most throughput but loses the ability to control the speed of each core/thread or to maintain a stable throughput.

To make communication more efficient between the requesting cores/threads and the QMD, in some embodiments one of three instructions is used. These instructions may help accelerate dequeue, enqueue, and data movement operations. These instructions are:

enqueue [reg] [addr]: In this instruction, reg is a 64-bit operand/register that contains the data to enqueue. The addr is the QMD's internal addresses used to identify a particular queue or buffer.

dequeue [reg][addr]: In this instruction, reg is the destination register to hold the return value returned from QMD. The addr is the QMD's internal addresses used to identify a particular queue or buffer.

enqueue_opt [reg] [addr]: This instruction behaves like the new enqueue instruction above, but with the additional step of pushing a copy of the data in the register to the LLC (i.e. via CLDEMOTE instruction to move the data from L1/L2cache to last level cache).

The enqueue, dequeue, and enqueue_opt instructions are executed by the CPU cores to communicate with the QMD. These go through a store queue, but are to be executed non-speculatively. While in the store queue, other store instructions could be reordered to execute before an earlier enqueue or dequeue instruction. Thus, a later store does not need to wait for an earlier enqueue or dequeue instruction to complete but may "jump the line." These instructions are sent out when they arrive at the head store queue and are only retired from the store queue when a response is returned from the QMD. In contrast to a normal store instruction, execution of a dequeue instruction includes the writeback stage to write data to destination registers.

Moreover, in executing an enqueue_opt instruction, in addition to performing an enqueue operation, the execution will also generate a memory request, i.e. "prepush," that behaves like an inverse prefetch request. Instead of fetching a cache block from a lower level cache to upper level cache, the additional memory request will push a cache block to the globally shared cache and invalidate the copy in its private caches. As a result, when another core requests to read or write to this cache block, the requesting core can read it from the globally shared cache instead of triggering data forwarding or invalidation requests. This saves a large number of cycles and NoC bandwidth. The pushed cache block will use the same path as writeback blocks. Note that the address of the block is specified by the reg operand. Thus, the content of reg must be a valid pointer and translated by MMU in execution stage. Prepush also a standalone instruction in some embodiments allowing for it to be called individually like a software prefetch instruction.

Figure 7:
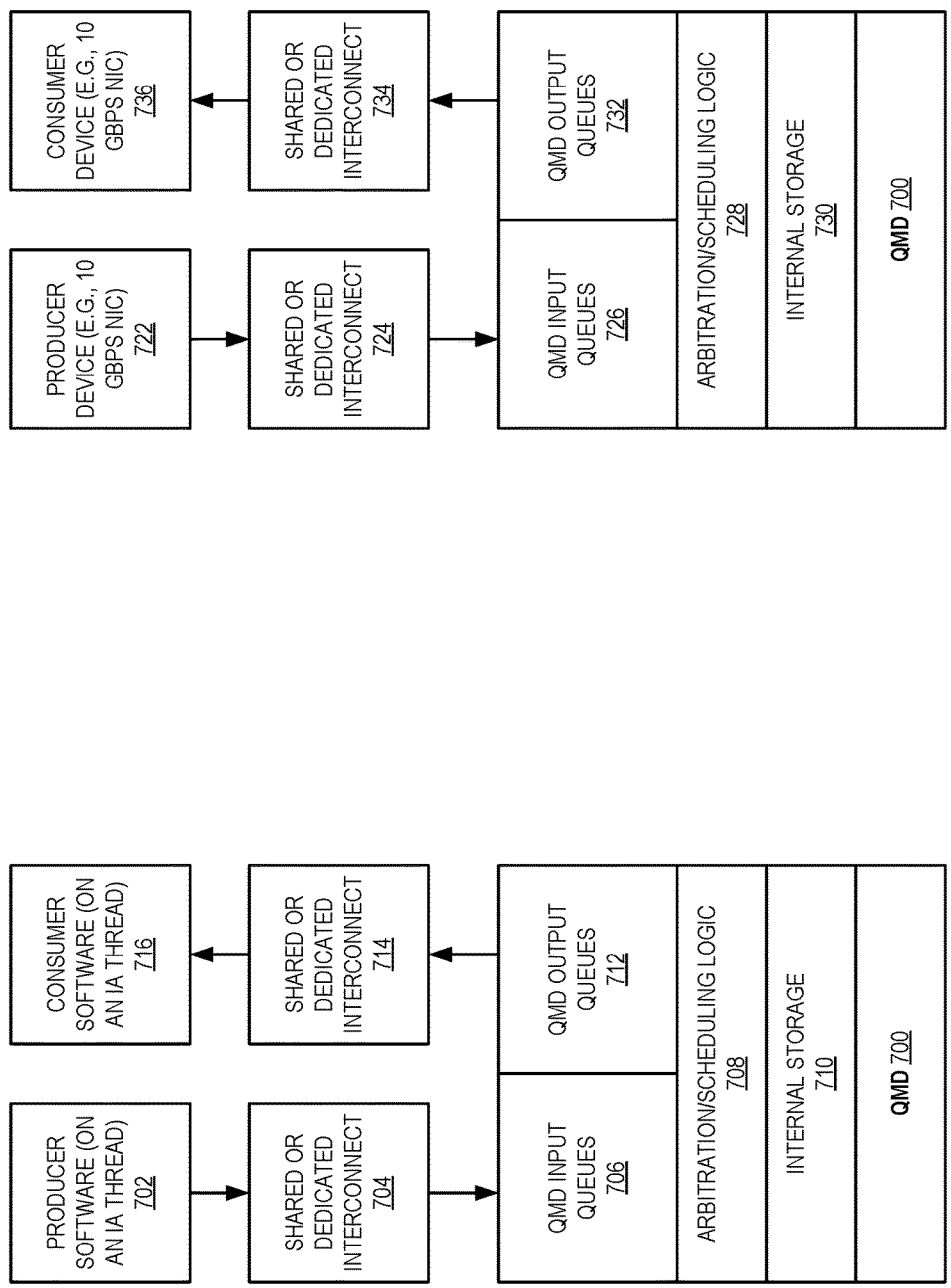
FIG. 7A is a block diagram illustrating the interaction between producer/consumer software and the queue management device.
FIG. 7B is a block diagram illustrating the interaction between hardware producer/consumer device and the queue management device.

A simplified view of the interaction between software threads and the QMD is shown in FIG. 7A according to an embodiment. The arrows indicate the flow of the shared data. In FIG. 7A, a producer software thread 702 submits an enqueue request, which contains the data item, to the QMD. The request is routed through a shared or dedicated interconnect 704. One of the QMD's input queues or buffers 706 receives and temporarily stores the incoming request. The request is then processed by the arbitration/scheduling logic 708 and the accompanied data item is stored in the internal storage 710. A subsequent dequeue request from a consumer software thread 716 is processed by the arbitration/scheduling logic 708 causes the data item to be retrieved from internal storage 710 and placed into one of the QMD's output queues 712. The data item is then routed through a shared/dedicated interconnect 714 to the consumer software 716. The shared/dedicated interconnects 704 and 714 may be the same interconnect or may not be different interconnects.

A similar diagram illustrating the interaction between producer/consumer hardware devices and the QMD is shown in FIG. 7B. A producer device 722 submits an enqueue request containing a data item to the QMD through a shared or dedicated interconnect 724. The quest is received and stored in the QMD's input queues 726. The arbitration/scheduling logic 728 selects the request from the input queues, processes it, and then stores the accompanied data item in the internal storage 730. Subsequently, a consumer's dequeue request to the QMD causes the data item to be retrieved from the internal storage unit 730 and placed into one of the QMD's output queues 732. The request is then routed by the shared or dedicated interconnect 734 to the consumer device 736. The shared/dedicated interconnect 724 and 734 may or may not be the same interconnect. Also note that although software-to-software and device-to-device data communications utilizing the QMD are illustrated in these figures, the QMD is not only limited to these applications. For example, the QMD may be used to manage other types of communication such as core-to-core, core-to-device, thread-to-thread, thread-to-device, etc.

Figure 8:
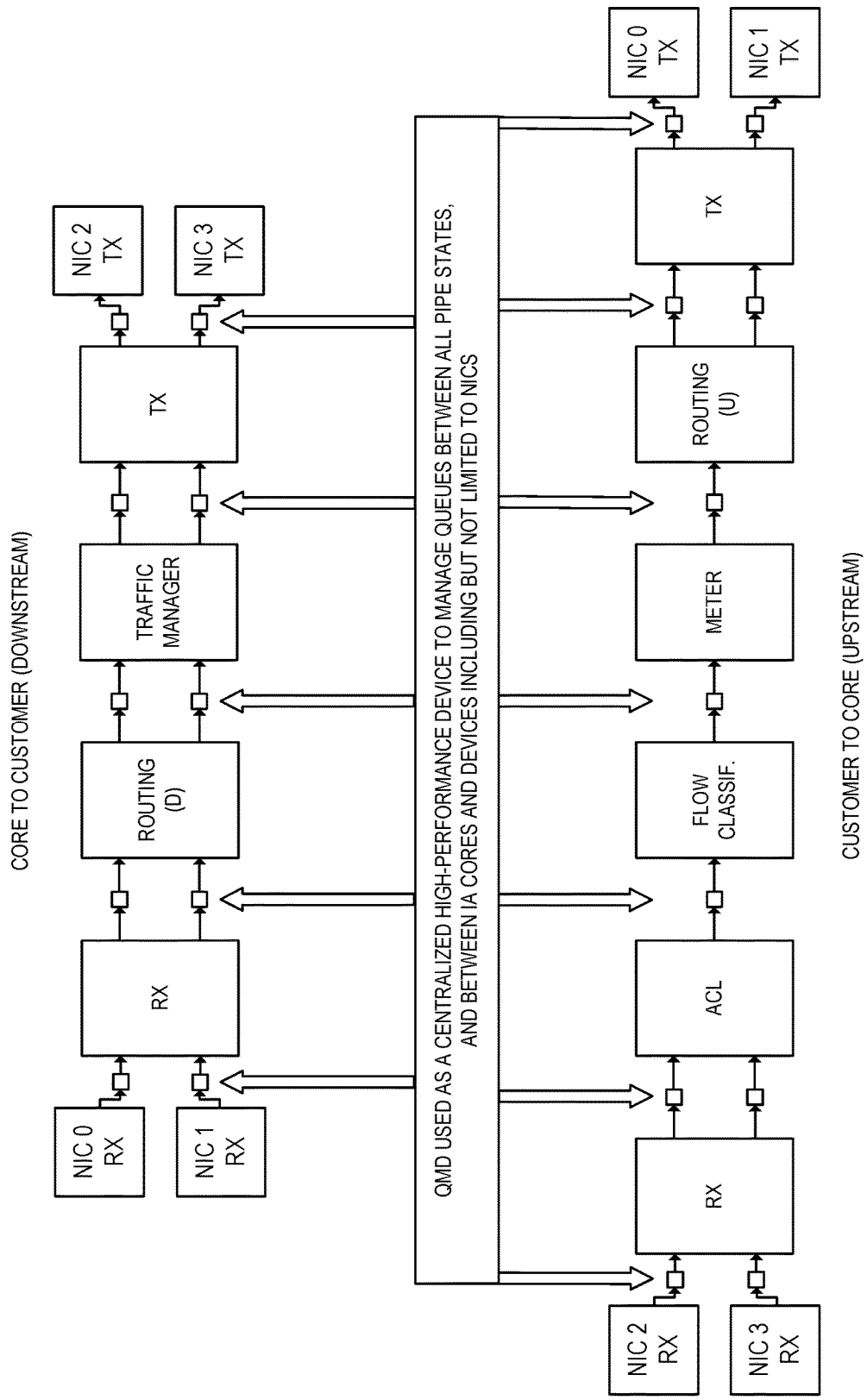
FIG. 8 is a diagram showing an exemplary wireless core network utilizing a centralized queue management device to manage queues between pipe stages.

FIG. 8 illustrates an advanced usage of the QMD as a centralized high-performance device for managing the queues between each adjacent steps in a network packet processing pipeline according to an embodiment. After passing through each stage in the pipeline, the network packets are temporarily stored in the queues maintained by the QMD before being retrieved and sent to the next stage. For example, in the core to customer (downstream) pipeline, the QMD serves as the intermediary step between NIC and receiving core, receiving core and routing core, routing core and traffic management core, traffic management core and transmitting core, and finally between transmitting core and receiving NIC. By moving the management of packets from a traditional software queue to a hardware accelerator such as the QMD, the software overhead needed to manage the flow of the network packets is greatly reduced. Moreover, as the number of pipeline processing stage increases, the benefits of offloading queue management tasks to the QMD is further amplified.

Figure 9:
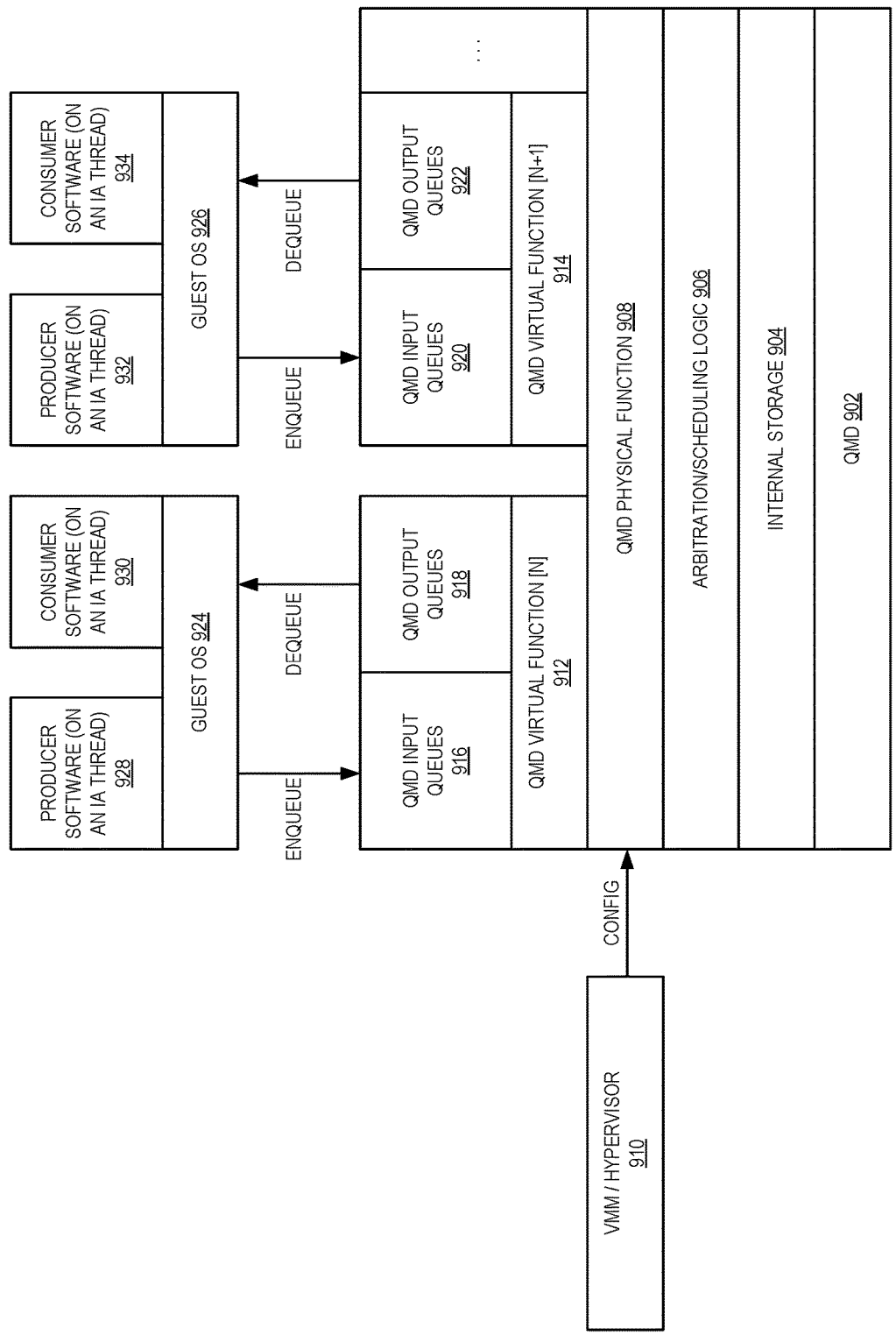
FIG. 9 is a block diagram illustrating virtualizing a queue management device to support multiple virtual machines.

FIG. 9 provides an example of virtualizing the QMD to guest operating systems through applying single root I/O virtualization ("SR-IOV") style techniques according to an embodiment. Although SR-IOV is described here, other virtualization methods and techniques may also be used. A virtual machine monitor ("VMM") or hypervisor 910 interface is provided to operate multiple virtual QMDs on top of the physical QMD 902. The VMM/hypervisor 910 manages and partitions the QMD's physical functions (i.e. resources) 908 into n sets of virtual functions (Q912 and 914) and allocates one set of virtual functions to each guest operating system (924 and 926). To the guest OS, each set of virtual functions operates as its own QMD. A producer software 928 running on guest operating system 924 that wishes to send data to consumer software 930 would first send an enqueue request containing the data to one of the input queues 916 of the virtual QMD. The QMD virtual functions then, through the hypervisor, processes the enqueue request utilizing the QMD's physical functions 908. The queue request is then scheduled and processed by the arbitration/scheduling logic 906 which causes the data to be stored in the internal storage 904. Next, a dequeue request send from the consumer software 930 running on guest operating system 924 is sent to one of the input queues 916 of the virtual QMD. The dequeue request is then processed by the QMD virtual functions 912 utilizing the QMD physical functions 908. The arbitration/scheduling logic 906 executes the dequeue request and causes the data to be retrieved from internal storage 904 and sent to the output queue 918. The data is then routed to the consumer software 930 on guest operating system 924.

Figure 10:
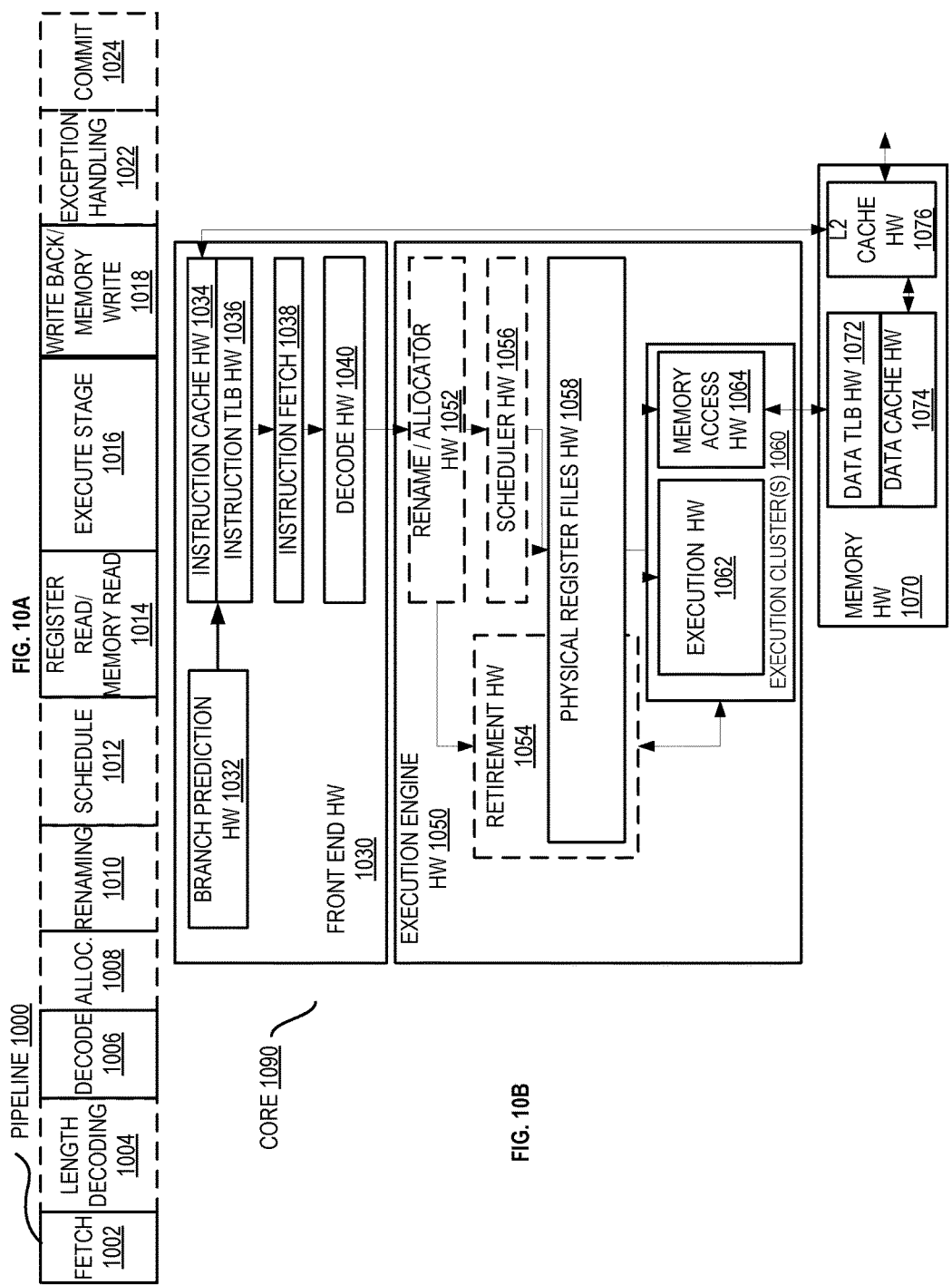
FIG. 10A is a block diagram illustrating both an exemplary in-order pipeline and an exemplary register renaming, out-of-order issue/execution pipeline according to embodiments of the invention.
FIG. 10B is a block diagram illustrating both an exemplary embodiment of an in-order architecture core and an exemplary register renaming, out-of-order issue/execution architecture core to be included in a processor according to embodiments of the invention.

FIG. 10A is a block diagram illustrating both an exemplary in-order pipeline and an exemplary register renaming, out-of-order issue/execution pipeline according to embodiments of the invention. FIG. 10B is a block diagram illustrating both an exemplary embodiment of an in-order architecture core and an exemplary register renaming, out-of-order issue/execution architecture core to be included in a processor according to embodiments of the invention. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front end hardware 1030 coupled to an execution engine hardware 1050, and both are coupled to a memory hardware 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end hardware 1030 includes a branch prediction hardware 1032 coupled to an instruction cache hardware 1034, which is coupled to an instruction translation lookaside buffer (TLB) 1036, which is coupled to an instruction fetch hardware 1038, which is coupled to a decode hardware 1040. The decode hardware 1040 (or decoder) may decode instructions, and generate as an output one or more micro-operations, micro-code entry points, microinstructions, other instructions, or other control signals, which are decoded from, or which otherwise reflect, or are derived from, the original instructions. The decode hardware 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM or other medium that stores microcode for certain macroinstructions (e.g., in decode hardware 1040 or otherwise within the front end hardware 1030). The decode hardware 1040 is coupled to a rename/allocator hardware 1052 in the execution engine hardware 1050.

The execution engine hardware 1050 includes the rename/allocator hardware 1052 coupled to a retirement hardware 1054 and a set of one or more scheduler hardware 1056. The scheduler hardware 1056 represents any number of different schedulers, including reservations stations, central instruction window, etc. The scheduler hardware 1056 is coupled to the physical register file(s) hardware 1058. Each of the physical register file(s) hardware 1058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) hardware 1058 comprises a vector registers hardware, a write mask registers hardware, and a scalar registers hardware. These register hardware may provide architectural vector registers, vector mask registers, and general purpose registers. The physical register file(s) hardware 1058 is overlapped by the retirement hardware 1054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement hardware 1054 and the physical register file(s) hardware 1058 are coupled to the execution cluster(s) 1060. The execution cluster(s) 1060 includes a set of one or more execution hardware 1062 and a set of one or more memory access hardware 1064. The execution hardware 1062 may perform various operations (e.g., shifts, addition, subtraction, multiplication) and on various types of data (e.g., scalar floating point, packed integer, packed floating point, vector integer, vector floating point). While some embodiments may include a number of execution hardware dedicated to specific functions or sets of functions, other embodiments may include only one execution hardware or multiple execution hardware that all perform all functions. The scheduler hardware 1056, physical register file(s) hardware 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler hardware, physical register file(s) hardware, and/or execution cluster—and in the case of a separate memory access pipeline, certain embodiments are implemented in which only the execution cluster of this pipeline has the memory access hardware 1064). It should also be understood that where separate pipelines are used, one or more of these pipelines may be out-of-order issue/execution and the rest in-order.

The set of memory access hardware 1064 is coupled to the memory hardware 1070, which includes a data TLB hardware 1072 coupled to a data cache hardware 1074 coupled to a level 2 (L2) cache hardware 1076. In one exemplary embodiment, the memory access hardware 1064 may include a load hardware, a store address hardware, and a store data hardware, each of which is coupled to the data TLB hardware 1072 in the memory hardware 1070. The instruction cache hardware 1034 is further coupled to a level 2 (L2) cache hardware 1076 in the memory hardware 1070. The L2 cache hardware 1076 is coupled to one or more other levels of cache and eventually to a main memory.

By way of example, the exemplary register renaming, out-of-order issue/execution core architecture may implement the pipeline 1000 as follows: 1) the instruction fetch 1038 performs the fetch and length decoding stages 1002 and 1004; 2) the decode hardware 1040 performs the decode stage 1006; 3) the rename/allocator hardware 1052 performs the allocation stage 1008 and renaming stage 1010; 4) the scheduler hardware 1056 performs the schedule stage 1012; 5) the physical register file(s) hardware 1058 and the memory hardware 1070 perform the register read/memory read stage 1014; the execution cluster 1060 perform the execute stage 1016; 6) the memory hardware 1070 and the physical register file(s) hardware 1058 perform the write back/memory write stage 1018; 7) various hardware may be involved in the exception handling stage 1022; and 8) the retirement hardware 1054 and the physical register file(s) hardware 1058 perform the commit stage 1024.

The core 1090 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1090 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache hardware 1034/1074 and a shared L2 cache hardware 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 11:
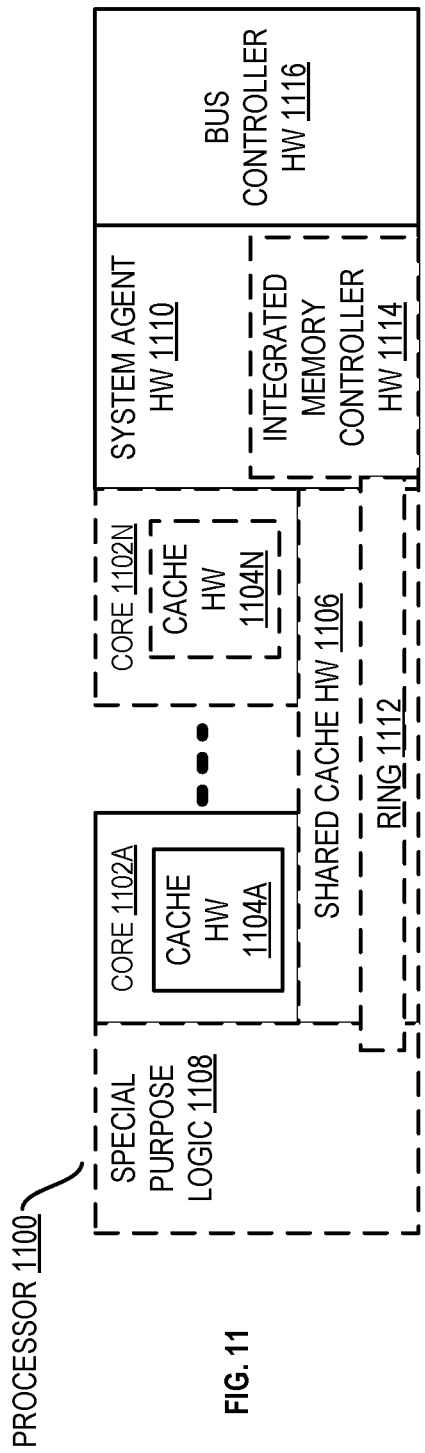
FIG. 11 is a block diagram of a single core processor and a multicore processor with integrated memory controller and graphics according to embodiments of the invention.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller hardware 1116, while the optional addition of the dashed lined boxes illustrates an alternative processor 1100 with multiple cores 1102A-N, a set of one or more integrated memory controller hardware 1114 in the system agent hardware 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache hardware 1106, and external memory (not shown) coupled to the set of integrated memory controller hardware 1114. The set of shared cache hardware 1106 may include one or more mid-level caches, such as level 2 (L2), level 3 (L3), level 4 (L4), or other levels of cache, a last level cache (LLC), and/or combinations thereof. While in one embodiment a ring based interconnect hardware 1112 interconnects the integrated graphics logic 1108, the set of shared cache hardware 1106, and the system agent hardware 1110/integrated memory controller hardware 1114, alternative embodiments may use any number of well-known techniques for interconnecting such hardware. In one embodiment, coherency is maintained between one or more cache hardware 1106 and cores 1102-A-N.

In some embodiments, one or more of the cores 1102A-N are capable of multithreading. The system agent 1110 includes those components coordinating and operating cores 1102A-N. The system agent hardware 1110 may include for example a power control unit (PCU) and a display hardware. The PCU may be or include logic and components needed for regulating the power state of the cores 1102A-N and the integrated graphics logic 1108. The display hardware is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set. In one embodiment, the cores 1102A-N are heterogeneous and include both the "small" cores and "big" cores described below.

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
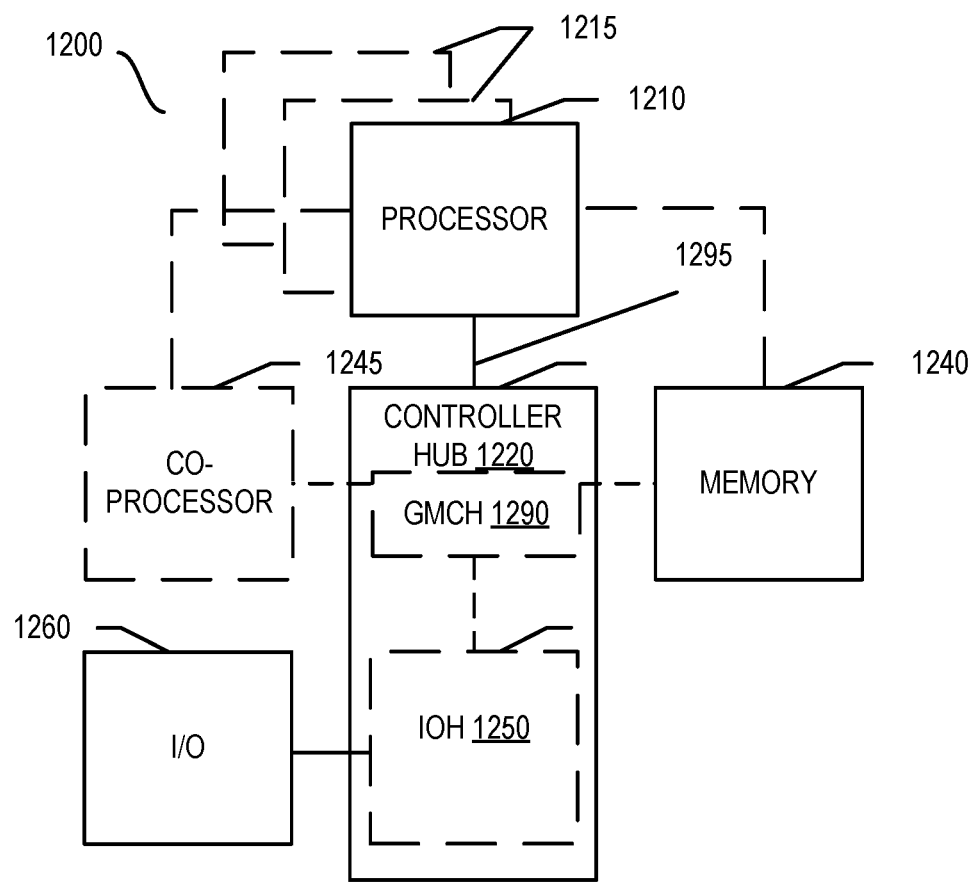
FIG. 12 illustrates a block diagram of a system in accordance with one embodiment of the present invention.

Referring now to FIG. 12, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface, or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
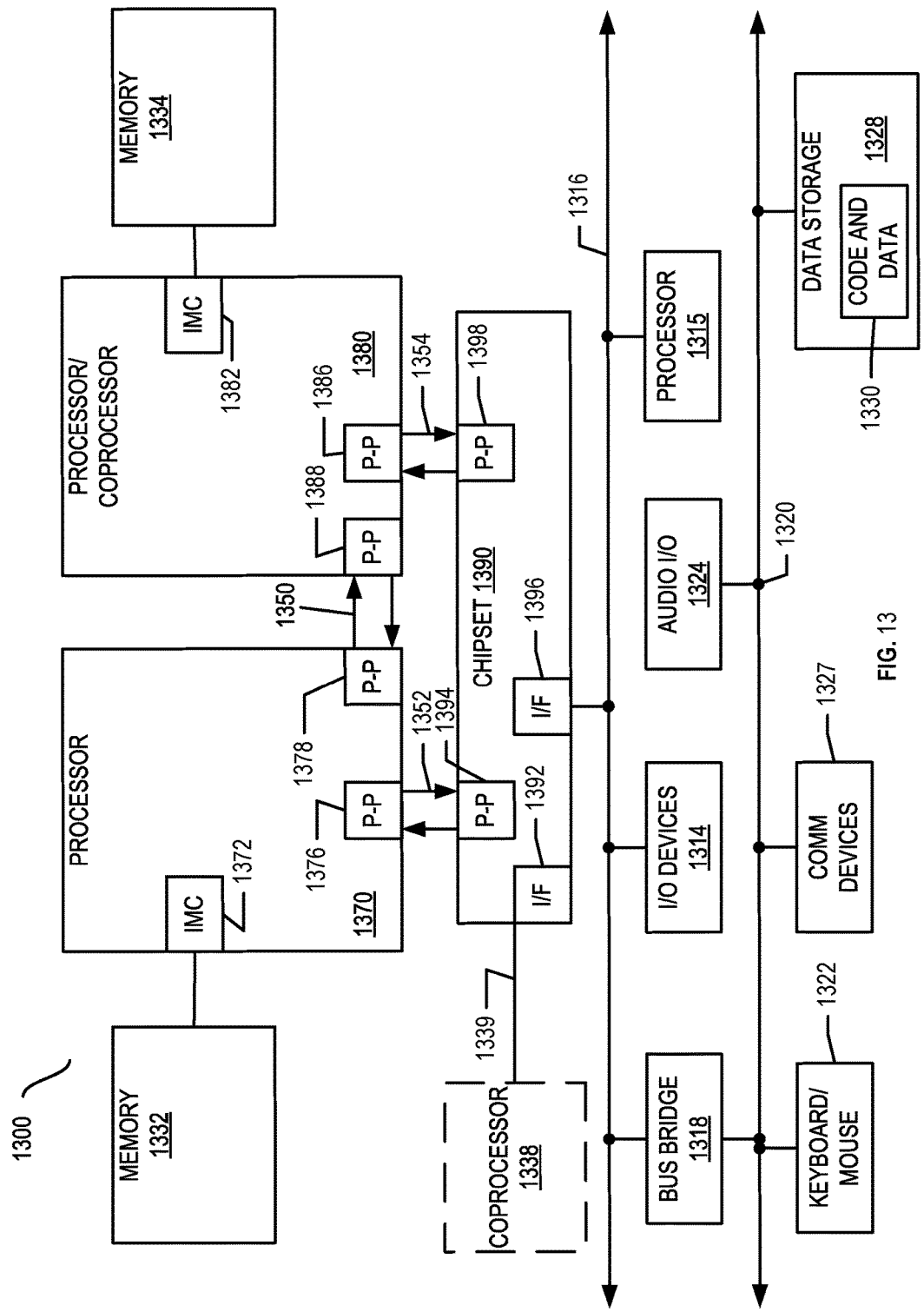
FIG. 13 illustrates a block diagram of a second system in accordance with an embodiment of the present invention.

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) hardware 1372 and 1382, respectively. Processor 1370 also includes as part of its bus controller hardware point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) hardware), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage hardware 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
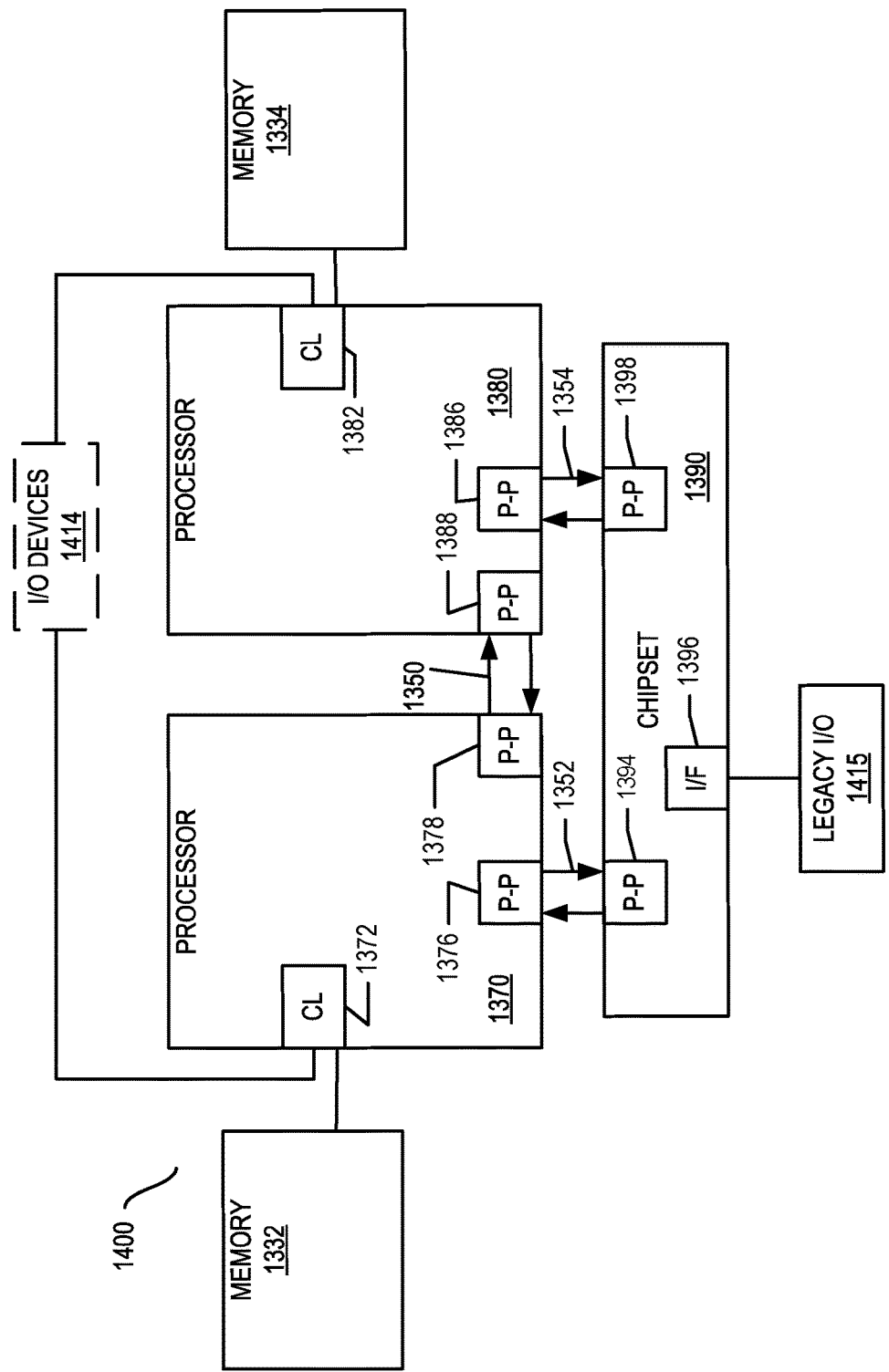
FIG. 14 illustrates a block diagram of a third system in accordance with an embodiment of the present invention.

Referring now to FIG. 14, shown is a block diagram of a second more specific exemplary system 1400 in accordance with an embodiment of the present invention Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller hardware and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
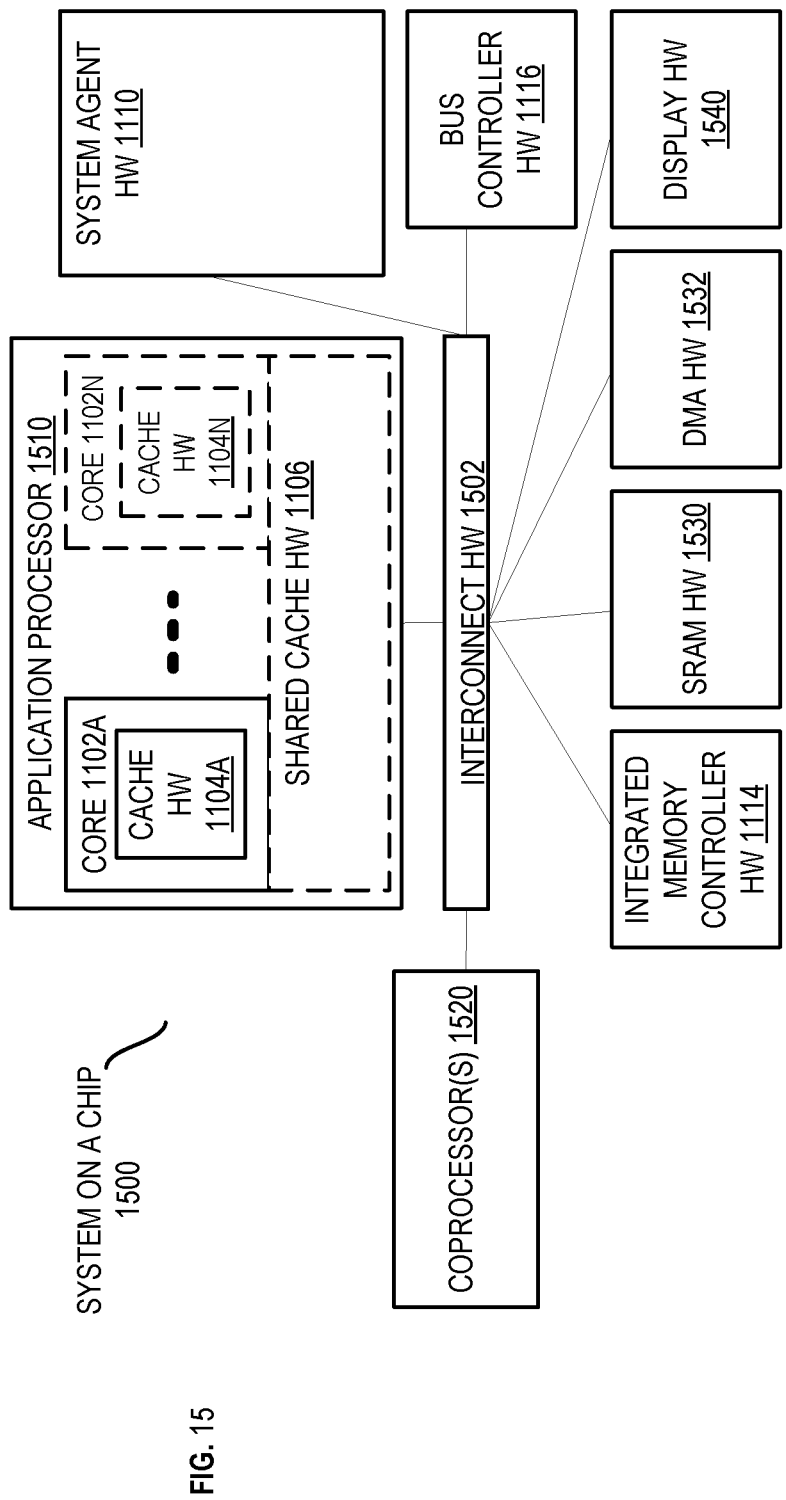
FIG. 15 illustrates a block diagram of a system on a chip (SoC) in accordance with an embodiment of the present invention.

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect hardware 1502 is coupled to: an application processor 1510 which includes a set of one or more cores 1102A-N and shared cache hardware 1106; a system agent hardware 1110; a bus controller hardware 1116; an integrated memory controller hardware 1114; a set or one or more coprocessors 1520 which may include integrated graphics logic, an image processor, an audio processor, and a video processor; an static random access memory (SRAM) hardware 1530; a direct memory access (DMA) hardware 1532; and a display hardware 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. An apparatus comprising:
   one or more memory buffers to receive and store a plurality of incoming requests submitted by one or more processor cores (requestors), the plurality of incoming requests comprising enqueue requests and dequeue requests;
   a scheduler circuitry to select, in accordance to a scheduling policy, a request from the plurality of incoming requests stored in one of the one or more memory buffers;
   an enqueue circuitry to process an enqueue request selected by the scheduler circuitry and responsively insert data associated with the enqueue request into an internal storage unit; and
   a dequeue circuitry to process a dequeue request selected by the scheduler circuitry and responsively retrieve data associated with the dequeue request from the internal storage unit and sending the retrieved data to the one or more requestors;
   wherein each of the one or more memory buffers corresponds to a respective one of the one or more requestors and stores only the incoming requests from the corresponding requestor.

2. The apparatus of claim 1, wherein the one or more memory buffers are first in, first out (FIFO) buffers.

3. The apparatus of claim 1, wherein the scheduling policy is a Round Robin policy.

4. The apparatus of claim 1, wherein the scheduling policy is a Weighted Round Robin policy.

5. The apparatus of claim 1, wherein the scheduling policy is a preemptive priority policy.

6. The apparatus of claim 1, wherein the internal storage unit is configurable to support data of varying lengths and sizes.

7. The apparatus of claim 1, further comprising:
   a resource management circuitry to set, according to a resource policy, one or more limits for each of the one or more requestors on number of incoming requests that may be submitted by each of the one or more requestors.

8. The apparatus of claim 7, wherein the resource policy includes a global resource pools and a plurality of local resource pools, the global resource pools to provide resource credits to be distributed amongst the plurality of local resource pools based on a credit replenishment policy.

9. The apparatus of claim 8, wherein each of the plurality of local resource pools to correspond to one of the one or more requestors, and the resource credit in a given local resource pool determines the number of requests that may be submitted by the local resource pool's corresponding requestor.

10. The apparatus of claim 9, wherein the resource credits include enqueue credits to allow the one or more requestors to submit enqueue requests and dequeue credits to allow the one or more requestors to submit dequeue requests.

11. The apparatus of claim 8, wherein the credit replenishment policy is Round Robin policy.

12. The apparatus of claim 8, wherein the credit replenishment policy is Weighted Round Robin policy.

13. The apparatus of claim 8, wherein the credit replenishment policy is preemptive priority policy.

14. The apparatus of claim 1, wherein each block of data to be inserted into the internal storage unit is combined with a metadata tag to indicate how the data should be handled by the enqueue circuitry and the dequeue circuitry.

15. The apparatus of claim 14, wherein the metadata tag includes an atomic parameter to indicate whether the retrieved data should only be sent to one requestor at a time.

16. The apparatus of claim 14, wherein the metadata tag includes a load-balancing parameter to indicate whether the retrieved data should be load-balanced across a plurality of output queues.

17. The apparatus of claim 14, wherein the metadata tag includes a reordering parameter to indicate whether the retrieved data should be reordered based on a sequence number, before the retrieved data is sent to the one or more requestors.

18. The apparatus of claim 14, wherein the metadata tag includes a fragmentation parameter to indicate whether the retrieved data can be divided into smaller blocks for traffic shaping, before the retrieved data is sent to the one or more requestors.

19. The apparatus of claim 1, wherein the retrieved data is combined with a demotion instruction, such that an execution of the demotion instruction by the one or more requestors to cause data to be moved from the internal storage unit to a cache communicatively coupled to and shared by the one or more requestors.

\* \* \* \* \*